INVENTORS
EARL G. HEDGER
GARY R. HUCKELL
DANIEL R. LEONARD

ATTORNEYS

United States Patent Office 3,437,750
Patented Apr. 8, 1969

3,437,750
AUTOMATIC GAIN CONTROL CIRCUIT FOR FACSIMILE RECORDER

Earl G. Hedger, San Diego, Gary R. Huckell, El Cajon, and Daniel R. Leonard, San Diego, Calif., assignors to the United States of America as represented by the Secretary of the Navy Filed Nov. 4, 1965, Ser. No. 506,907
Int. Cl. H04n 5/38, 5/52
U.S. Cl. 178—7.3 5 Claims

ABSTRACT OF THE DISCLOSURE

An AGC system is provided for a facsimile recorder in which the received facsimile signal is demodulated and applied to a threshold detector. The detector performs the function of passing only signals having a magnitude equal to that of the facsimile phasing pulses. The signals thus passed are applied to a differential amplifier and subsequently to an integrator. The resultant integrated voltage is then employed to control the magnitude of the received signals before demodulation.

The invention described herein may be manufactured and used by or for the Government of the United States of America for governmental purposes without the payment of any royalties thereon or therefor.

For good quality pictures to be reproduced on a facsimile recorder, it is imperative that the magnitude of the signals being recorded be maintained as nearly as possible at some fixed predetermined level. Since actual signals being received in practical facsimile systems are subject to magnitude variations from transmission paths, etc., some type of automatic gain control device must be interposed between the source of signals and the recorder.

Most facsimile systems utilize one of two general types of automatic gain control circuits. The first type sets the amplifier gain at the beginning of each picture and maintains this fixed gain regardless of the level of the input signal throughout the picture. When a picture is comprised of 800 lines, with each line being 250 microseconds in length, a period of over 3 minutes occurs between gain settings. Over such a period of time, the magnitude of the signals cannot be expected to maintain the level they had at the beginning of the picture and, consequently, poor quality pictures are quite probable. It is therefore apparent that the signal should be checked more frequently during the course of the picture.

The second type of generally used automatic gain control circuit overcomes the inadequacy of the first noted type in that gain adjustments are made at the beginning of each line by responding to the amplitude of the sync pulse transmitted during the blanking signal contained in each line. This type of arrangement works very well but is limited to operating on signals which contain sync pulses.

In many present day facsimile operations, such as those encountered in picture transmissions from satellites to the earth, the inclusion of a sync signal in the facsimile signal is not feasible. For the transmitted facsimile signal to also contain the synchronization signals, additional equipment is necessary at the transmitter for the generation of such sync signals. In environments such as satellites, size and weight considerations sometimes dictate that additional equipment cannot be accommodated. A need, therefore, exists for a facsimile automatic gain control circuit which does not depend upon reception of a sync signal on a line of the picture and yet, makes a gain adjustment more frequently than once per picture, i.e., once every 800 lines.

An object of the present invention is, therefore, to provide an automatic gain control for facsimile recorders.

A further object of the present invention is to provide a facsimile recorder automatic gain control which operates substantially all of the time a picture is being received.

Another object of the present invention is to provide an automatic gain control for a facsimile recorder which is not dependent on sync signals transmitted on each line of the picture.

In accordance with this invention, the foregoing and other objects are achieved by providing an automatic gain control circuit which relies on the detection of facsimile phasing pulses for its operation. Phasing pulses are transmitted at the beginning of each line of the facsimile signal and are essentially used to ensure that each line of the picture being recorded is in alignment with the other line, i.e., the picture is not skewed. The phasing pulses are distinguishable from the remainder of the facsimile signal since they are transmitted at the largest amplitude, which amplitude represents maximum white. It is possible, however, for portions of the picture being recorded to have maximum white areas in them and, steps must be taken to ensure that maximum white video signals are not mistaken for phasing pulses by the gain control circuitry.

The invention essentially comprises firstly, a control gate through which the modulated-carrier facsimile signals pass. The gain of the gate is variable in response to a control signal applied to the gate. Signals at the output of the gate are demodulated and passed through a threshold detector in order to separate the phasing pulses from the video information. Signals exceeding the threshold of the threshold detector are compared with a reference in a differential amplifier. The output of the differential amplifier is integrated and the integrated signal is applied to the control input of the control gate. The key to the successful operation of the invention is the fact that the integrator has a long time constant resulting in the gain control device being responsive only to phasing pulses and not video pulses of maximum white.

The invention will be better understood and other and further objects of this invention will become more apparent from the following specification and drawings, wherein.

Before beginning a detailed discussion of the invention, the nature of the facsimile signal should first be understood. The most common satellite facsimile systems use a 2400 c.p.s. subcarrier modulated by the video information. The maximum amplitude video signal represents white and a minimum amplitude black. A complete picture comprises 800 lines of video, each being 250 microseconds in duration. At the beginning of each line, a 12.5 microsecond phasing signal is transmitted. As discussed above, the phasing signal has a magnitude analogous to a maximum white video signal. It is this maximum magnitude characteristic of the phasing pulse upon which this invention depends.

It should be understood that the above-mentioned frequencies and times are merely illustrative and do not limit the breadth of the invention in any way. It should also be understood that the facsimile signals may be received directly form the output of some form of radio received, wire line, tape recorder, or any other suitable source.

Figure 1:
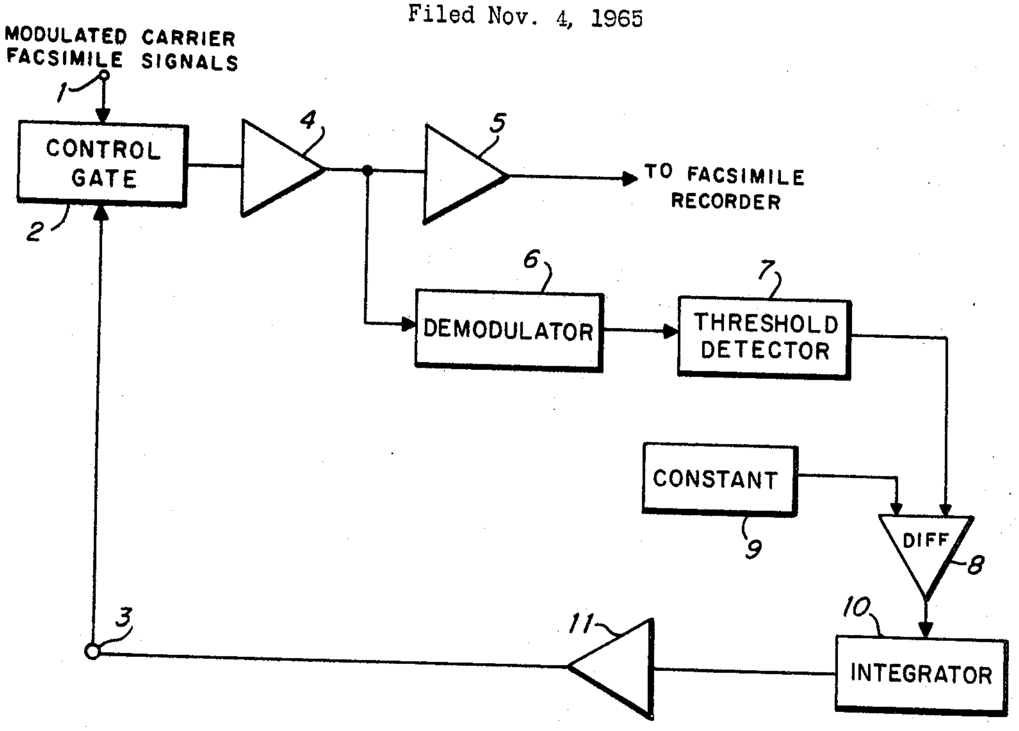
FIG. 1 is a block diagram of one embodiment of the invention.

Referring now to FIG. 1, an input terminal 1 is shown and it is at that point that the modulated carrier facsimile signals enter the circuitry of this invention. The received signals are passed through control gate 2 wherein their magniude is varied in response to the magnitude of a signal at control input 3. An AC amplifier 4 serves to couple the signals from the output of the control gate 2 to an output amplifier 5 and demodulator 6. A facsimile recorder, not shown, receives the signals from the output of amplifier 5.

Demodulator 6 functions to detect the information signals from the modulated carrier. The particular type of detection circuitry in the demodulator 6 is dependent on the form of modulation of the facsimile signals. It should be understood that any suitable conventional detection means may be used. At the output of demodulator 6 pure video information is available.

Threshold detector 7 receives the video information and functions to pass only portions of said video information having a magnitude greater than some predetermined level or threshold. The threshold level is adjusted so that substantially all of the video is blocked and only the higher magnitude phasing pulses are present at the output of the detector 7. As discussed previously, however, some portions of the video may be sufficiently white, i.e., of high magnitude, that they may also pass through the threshold detector. Various methods of threshold detection are available in the prior art, such as back-biased diodes, and consequently, the details of the particular detector used do not form a part of this invention and consequently will not be described in detail.

Those signals which do exceed the threshold are available at the output of the threshold detector 7 and are passed on to one input of a differential amplifier 8. A source 9 of constant voltage supplies the other input to the differential amplifier 8 and provides a signal through which the first input may be compared. At the output of differential amplifier 8, a voltage proportional to the difference in magnitude of the two input signals is present. The output of differential amplifier 8 is intermittent in nature and consequently, integrator 10 is used to provide a smoothly varying DC signal from the intermittent output of said differential amplifier or comparator. The DC output of the integrator 10 is supplied to control input 3 of the control gate 2 by a DC amplifier 11.

Integrator 10 also performs another necessary function. As mentioned previously, high amplitude video signals could possibly be mistaken for phasing pulses by the detection circuitry. If the control gate responded continuously to differences in magnitude indicated by the detection circuitry, the final results would be that the modulation would essentially be removed from the facsimile signal over a period of time since the gain control would counteract the gain variations in the video information signal. The threshold detector 7 would not inhibit such operation since gradually the control gate would introduce sufficient gain to the facsimile signals so that all of the video would be of sufficient magnitude to be passed through the threshold detector. To avoid such a consequence, instantaneous response of the circuitry must be prevented. Integrator 10 provides the remedy by being designed with a relatively slow response time, i.e., a long time constant. For satisfactory operation with the signals having parameters as discussed above, it has been found that a time constant of at least one second is desirable. This represents the time necessary for four lines of video information and any necessary gain compensation is delayed by four lines. Such compensation, however, provides a suitable compromise between the once per picture gain check and the once per line adjustment possible when sync signals are present.

Figure 2:
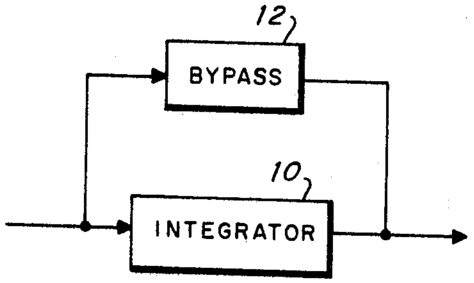
FIG. 2 is a block diagram of a modification of the embodiment for FIG. 1.

Referring now to FIG. 2, a modification to the embodiment of FIG. 1 is shown. The modification comprises providing integrator 10 with a bypass means 12 for bypassing the time delay effect of the integrator and providing instantaneous gain response in certain situations. Such a situation exists, for example, when all of the circuitry has been on for a period of time without the reception of any facsimile signals at the input terminal 1. With no signal at the input, the gain of the control gate 2, over a period of time, rises to a maximum since the gain control circuitry tries to compensate for zero signal, or lack of signal, at the input to the control gate. In such a situation, when facsimile signals are presented to the input 1, they are over amplified in gate 2 and the signal supplied to the recorder is many times beyond its desired magnitude. Bypass device 12 is essentially another threshold detector set to respond only to extremely large output signals from the differential amplifier. The integrator 10 is bypassed in such a situation thus permitting the gain of the control gate 2 to be reduced to the proper value. Bypass 12 also functions to speed up the process at starting the equipment from a cold start to rapid operation.

It can therefore be seen that this invention provides an automatic gain control device which overcomes the deficiencies of the once-per-picture type and approaches the ideal once-per-line operation without necessitating the reception of facsimile signals having superimposed sync pulses to key the gain control circuitry to its operation time.

Although only one embodiment has been shown, it should be understood that the invention should not be limited thereto for obvious modifications by one skilled in the art are possible within the scope of this invention.

What is claimed is:

1. In a facsimile recording system for recording facsimile video signals, means for automatically controlling the magnitude of said video signals in response to the magnitude of a phasing pulse received at the beginning of each line of said facsimile video signal, said phasing pulse having a magnitude greater than substantially all of said video information, said means for atuomatically controlling the magnitude comprising, a control gate for receiving modulated carrier facsimile signals and adapted to vary their magnitude in response to the magnitude of a control signal input, demodulator means for receiving signals from said control gate and producing a demodulate output containing the modulating information of said facsimile signals, threshold detector means adapted to receive demodulated facsimile signals from said demodulating means and produce an output only when said demodulated signals substantially equal a predetermined magnitude, said predetermined magnitude being on the order of the magnitude of said phasing pulse, comparator means adapted to receive signals from the output of said threshold detector and a reference signal and provide a difference signal responsive to differences between said threshold detected signal and said reference signal, integrating means for producing a smoothly varying DC signal from the difference signal of said comparator, means for coupling the DC signal from said integrator to said control signal input of said control gate, whereby a gain-controlled facsimile signal is available at said gate.

2. The automatic gain control means of claim 1 wherein, said integrator has a time constant substantially equal to or greater than the time duration of four lines of said facsimile video signal.

3. The automatic gain control means of claim 2 further including bypass means responsive to difference signals greater than some predetermined magnitude and adapted to supply said signals greater than said predetermined magnitude directly to said coupling means without being integrated.

4. The automatic gain control means of claim 2 further including amplifier means for receiving gain controlled facsimile signals from said control gate and supplying them to a facsimile recorder.

5. The automatic gain control means of claim 4 wherein said means for coupling the DC signals from said integrator comprises a DC amplifier and further including, an AC amplifier for amplifying signals from said control gate before they are supplied to said detector.

References Cited

Kiver: Television Simplified, 5th ed., 1955, p. 143.

ROBERT L. GRIFFIN, *Primary Examiner.*

R. L. RICHARDSON, *Assistant Examiner.*

U.S. Cl. X.R.

178—6.6